United States Patent Office 3,449,194
Patented June 10, 1969

---

3,449,194
PROCESS OF LAMINATING WOOD USING VINYL-IDENE CHLORIDE-ACRYLONITRILE COPOLYMER LATEX BASED ADHESIVES
Norman E. Scheffler and Frederick Le Roy Brown, Midland, Mich., assignors to The Dow Chemical Company, Midland, Mich., a corporation of Delaware
No Drawing. Filed Feb. 1, 1965, Ser. No. 429,664
Int. Cl. C09j 3/06
U.S. Cl. 156—331                                   2 Claims

---

ABSTRACT OF THE DISCLOSURE

This invention is directed to an improved process for laminating wood and wood products utilizing as an adhesive composition an aqueous latex of an interpolymer consisting essentially of (a) from about 90 to 94 weight percent of vinylidene chloride and from about 6 to 10 weight percent of acrylonitrile interpolymerized with (b) from about 1 to 4 weight percent of a specified water-soluble salt of an amino alcohol ester of an unsaturated carboxylic acid. The prescribed adhesive compositions provide unexpectedly enhanced hot-press cure rates, adhesive strength and resistance to delamination.

---

In accordance with the present invention, compositions especially suited for utilization as hot-press, water-resistant adhesives for lignocellulosic elements such as wood and its products are prepared from a cationic latex comprising an interpolymer of (a) from 90 to 94 weight percent vinylidene chloride, and, complementarily, from 6 to 10 weight percent acrylonitrile and preferably from 91 to 92 weight percent vinylidene chloride and from 8 to 9 weight percent acrylonitrile, interpolymerized with (b) from about 1 to 4 weight percent, based on the weight of the interpolymer of at least one water-soluble salt of an amino alcohol ester of an unsaturated carboxylic acid having the formula:

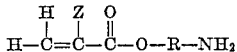

wherein the symbol "—R—" represents an alkylene radical containing from 2 to 6 carbon atoms and "Z" is selected from the group consisting of hydrogen, a halogen such as chlorine or bromine and an alkyl radical having from 1 to 4 carbon atoms.

Exemplary of the amino alcohol esters of unsaturated carboxylic acids which are advantageously employed for the purposes of the present invention are: 2-aminoethylacrylate, 2-aminoethyl-2-chloroacrylate, 2-aminoethyl-2-methylacrylate, 2-aminoethyl-2-ethylacrylate, 2-aminoethyl-2-propylacrylate, 2-aminoethyl-2-butylacrylate, 2-aminohexylacrylate and the corresponding 2-methylacrylate, 2-ethylacrylate, 2-propylacrylate, 2-butylacrylate, 2-chloroacrylate and 2-bromoacrylate derivatives thereof.

In the practice of this invention, the amino alcohol esters of unsaturated carboxylic acid, as defined herein, are employed in the form of their water-soluble salts, preferably salts of the hydrogen halides, such as hydrochloric acid and hydrobromic acid and salts of acids such as sulfuric acid and toluene-sulfonic acid.

The invention further contemplates the addition to the adhesive compositons of water-soluble or water-dispersible, finely divided fillers such as water-soluble or water-dispersible proteinaceous and carbohydrate or mineral materials and mixtures or blends thereof. Exemplary of preferred fillers are those materials which are proteinaceous in nature such as a finely divided soybean protein flour. Other proteinaceous materials finding utility, however, include zein, gluten, casein, sodium caseinate, soluble blood, wheat flour, soybean-blood blends, soybean-α-protein, walnut shell flour and other known protein products. Exemplary of the carbohydrates are corn starch, black strap molasses, dextran and cationic starch. Other fillers will be apparent to the skilled worker.

The finely divided filler may be employed in a wide range of proportions to suit equipment or process capabilities or limitations and to tailor the formulation to the equipment, process, or use. Thus, desirable benefits of adhesiveness may be attained when there is used as little as about 5 percent of filler, based on the weight of latex solids. At the other extremity, it has been found that the indicated utility is retained when the formulation contains 100 or more percent of latex solids. As a general rule it may be stated that as the proportion of filler is increased with a given latex solids there results a decrease in water resistance to the cured or set adhesive composition. However, it also follows that this water resistance is dependent to a significant extent on the cure temperature employed. As the proportion of filler is increased, it is necessary to employ a higher cure temperature to reach a given water resistance. The optimum water resistance and other properties will thus be capable of variation within wide limits.

The solids content of the latexes of the present invention will vary according to individual preference, the equipment available, and the adhesive applying technique desired. When spray methods are used to coat individual fibers for making fiber board, it may be desirable to use very thin dispersions of low solids content. When doctoring the composition onto wood veneers or the like, it may be be desirable to employ paste-like masses of from about 20 to about 60 or more percent by weight of solids. The compositions may be employed in any proportion of solids commonly used with the conventional adhesive applying techniques without reduction in the beneficial results.

The invention contemplates that the defined cationic latexes may contain polymerization catalysts of kinds known to promote emulsion polymerization. Among such catalysts are water-soluble oxidizing agents such as hydrogen peroxide and potassium persulfate and catalysts which, like the redox catalysts, are activated in the water-phase, e.g., by a water-soluble reducing agent. A particularly desirable catalysts system comprises a peroxide such as hydrogen peroxide, or cumene hydroperoxide and ferric ions in an aqueous medium having a pH value of not more than about 3.5 while using sodium sulfoxylate formaldehyde as an activator. The starting composition may include acids or salts to provide a desired pH value and possibly a buffered system.

The invention further particularly contemplates latexes wherein the constituents are charged in a sequence, perhaps coordinated with a polymerization sequence, and/or the polymerization is carried out in a plurality of stages.

A particularly advantageous method for preparing the cationic latexes employed by the present invention resides in first forming a polymeric seed particle of the defined vinylidene chloride polymer by addition of a first, small amount of the required essentially water-insoluble monomeric material to the aqueous medium having the desired pH value, followed by the subsequent addition of the necessary polymerization catalyst. When forming such polymeric seed particles by the procedure as described herein, small amounts of conventional cationic or non-ionic wetting agents, such as cationic or non-ionic soaps or the like, may be incorporated in the aqueous medium to aid in the attainment of particles of desired size. Following the formation of the polymeric seed particles, the remaining monomeric constituents and the required amounts of the herein defined water-soluble salt of an amino alcohol ester of an unsaturated carboxylic acid are simultaneously and continuously added under carefully controlled conditions to the aqueous medium to form a polymer particle having as its outer surface, predominant amounts of the water-soluble amino alcohol ester constituent, which is polymerically combined with minor amounts of the essentially water-insoluble monomeric constituent.

The latexes prepared by such process are characterized by the virtual absence of undesirable coagulum and are characterized by high colloidal stability.

In preparing composite wood or other structures with the adhesive compositions of the invention, the permanent desired joinder is effected under the influence of heat at an elevated curing temperature for a sufficient period of time to permit the adhesive composition to be thoroughly cured in situ while in binding contact with wood or other filler or article being joined or bonded. Advantageously, the adhesive composition is joined and set to bind the composite structure under a compressive effect of an applied pressure on the wooden or equivalent structures or particles being joined or coalesced during the curing of the adhesive composition.

The pressure that is utilized need only be sufficient to ensure an intimate contact between the bonding surfaces. Of course, relatively high pressures, such as may be developed by, under, or with the assistance of platens, rams and other pressing apparatus may also be employed. Thus, the pressure that is effected to compact the material being joined during setting of the adhesive composition may be between about 15 pounds or less and 200 or more pounds per square inch, depending upon whatever conditions may be best suited and the practice that may be most desirable or favored when manufacturing various composite articles and structures.

In general, it is usually necessary to employ a temperature from a heat-exchanging means of at least about 200° F. to effectively cure the adhesive composition. The period of time that the curing heat is applied depends somewhat, as will be appreciated by those skilled in the art, upon the configuration and particular constitution of the structure being joined or bound as well as upon the heating conditions that are utilized and the heat transferring or exchanging efficiencies that may be involved. It will hereinafter be apparent, however, that utilization of the adhesive compositions of the present invention will significantly reduce the curing time required for good bonding while maintaining excellent moisture-resistance and/or adhesive strength and binding capacity.

Wood and the like composite products that may be glued, joined or laminated with the advantageous adhesive compositions of the invention (such as laminate plywood from sheets and veneers; panels, particle boards and the like from chips and other filler particles; paper-like products from short hardwood fibers or various natural and synthetic fibers or any desired mixtures of such fiborus materials, etc.) further have suitable initial strength as composite structures, excellent cold soak wet strength and exceedingly good retention of their strength even after being subjected to boiling water for considerable periods. Conventional amounts of the adhesive composition of the invention may be utilized for joining or binding wood and the like in any particular application. In fact, it is one of the benefits of the instant invention that frequently less adhesive is necessary for binding the wood than with the prior known adhesives. It has further been found that the compositions comprising the persent invention are partciularly useful when applied as sizing for paper and paper products.

The following examples, wherein all parts and percentages are to be taken by weight, illustrate the present invention but are not to be construed as limiting its scope.

EXAMPLE I

Into a polymerization vessel was charged a mixture of about 500 milliliters of deionized water (adjusted to a pH of about 3.5), about 0.20 milliliter of ferric nitrate corresponding to 0.34 milligram of iron, and 0.50 gram of cumene hydroperoxide. To this mixture was subsequently added an initial monomer charge comprising: 22.75 grams of vinylidene chloride and 2.25 grams of acrylonitrile. The reaction mixture was then stirred under nitrogen for a period of about 10 minutes at a temperature of about 25° C., and a solution comprising about 1.2 gram of sodium sulfoxylate formaldehyde dissolved in 98.8 parts of deionized water was thereafter added to the reaction mixture at a rate of about 7.67 grams of the solution per hour, for a period of about ½ hour, to polymerize the initial charge of monomeric materials. Thereafter, a second monomeric mixture comprising 1,365 grams of vinylidene chloride and 135 grams of acrylonitrile and 12 grams of cumene hydroperoxide was added to the polymerization vessel, simultaneously with, but separate from the solution of sodium sulfoxylate formaldehyde, at a rate of about 69 grams of the mixture per hour for a period of 15 hours at a temperature of about 25° C. Over the same period of time a solution comprising 40 grams of the hydrochloride of 2-aminoethyl methacrylate, dissolved in 700 grams of deionized water was separately added to the polymerization vessel at a rate of 23.7 grams of solution per hour. Following the addition of the polymerizable material, the previously described aqueous solution of sodium sulfoxylate formaldehyde was added to the polymerization vessel at a rate of about 7.67 grams of solution per hour for a period of about two hours to provide completion of polymerization. There was thereby obtained a highly stable colloidal dispersion of about 45.7 percent solids containing a copolymer of 91 weight percent vinylidene chloride and, complementarily, 9 weight percent acrylonitrile stabilized with a small amount of the hydrochloride of 2-aminoethyl methacrylate polymerically combined therewith.

The interpolymer latex thus prepared was divided into 2 parts and adhesive compositions of varying formulations prepared from each. Composition 1 consisted of the interpolymer alone having about 45.7 percent solids. Composition 2 was made up of 4 parts of latex solids per 1 part of a finely divided soybean flour.

Three ply yellow birch panels were prepared from ⅟₁₆ inch rotary cut veneer in a size of 8 inches by 12 inches. The formulations were brushed onto the veneer and pressed for 2, 4 and 6 minutes at 200 lbs./in.² using a platen temperature of 300° F. The panels were cut into standard plywood strip shear specimens for testing according to Commercial Standard C535–56 Section 5.4.1 "Dry Shear Test" and Section 5.4.2 "Cyclic Boil Test." The results are recorded in Table I as follows.

A series of control panels (Compositions 3 and 4) was prepared as described herein utilizing the anionic co-monomeric emulsifier sodium sulfoethylmethacrylate as a replacement for the cationic 2-aminoethyl methacrylate material. Another series of control panels (Composition 5) was prepared as described herein utilizing the tertiary amine N,N-dimethyl-2-aminoethyl methacrylate hydrochloride as the comonomeric emulsifier.

TABLE I.—PLYWOOD STRENGTH DATA OBTAINED FROM PANELS MADE WITH FORMULATIONS OF LATEX WITH VARYING AMOUNTS OF A CRUDE SOYBEAN FLOUR

[Latex: Copolymer of 91 percent vinylidene chloride/9 percent acrylonitrile containing about 2 percent of a comonomeric emulsifier]

| Test Sample Identification | Emulsifier | Soybean Flour, Percent of Latex Solids | Cure Cycle, Minutes at 300° F. Platen Temperature | Strength Dry, p.s.i. | Cyclic Boil, p.s.i. |
|---|---|---|---|---|---|
| This Invention: | | | | | |
| Composition 1 | 2-aminoethylmethacrylate hydrochloride | 0 | 2 | 671 | 240 |
| | | | 4 | 716 | 198 |
| | | | 6 | 682 | 278 |
| Composition 2 | do | 25 | 2 | 619 | 213 |
| | | | 4 | 690 | 224 |
| | | | 6 | 613 | 241 |
| For Comparison: | | | | | |
| Composition 3 | 2-sulfoethyl methacrylate | 0 | 2 | 565 | (1) |
| | | | 4 | 679 | 166 |
| | | | 6 | 610 | 24 |
| Composition 4 | do | 25 | 2 | 612 | (1) |
| | | | 4 | 588 | 70 |
| | | | 6 | 616 | 65 |
| Composition 5 | N,N-dimethyl-2-aminoethyl methacrylate | 0 | 2 | ........ | (1) |
| | | | 4 | ........ | (1) |
| | | | 6 | ........ | (1) |

[1] Delaminated.

EXAMPLE II

In each of a series of experiments (Compositions 6–11) several vinylidene chloride polymer latexes of varying polymeric composition interpolymerized with about 2 weight percent of a comonomeric emulsifier, based on the weight of copolymer, were separately prepared utilizing the procedures essentially as described in Example I.

Three-ply Douglas Fir panels were prepared from 1/7 inch rotary cut heartwood veneer in a size of 8 inches by 12 inches. Each latex based adhesive formulation, as hereinafter described, was individually and separately brushed onto the core veneer and panels were assembled and pressed for 1½ and 3 minutes at 200 lbs./in.² using a platen temperature of 300° F. The panels were each then cut into standard plywood strip-shear specimens for testing according to Commercial Standard C545-55 Section 5.3.2 "Boiling Test." Dry Shear Tests were also run. The latex compositions employed and results obtained are recorded in Table II as follows.

Composition 12 represents a commercially available and conventionally employed resorcinol-formaldehyde adhesive composition.

TABLE II.—PLYWOOD STRENGTH DATA OBTAINED FROM PANELS MADE WITH FORMULATIONS OF LATEXES OF VARYING POLYMER COMPOSITION

| Test Sample Indentification | Polymer Composition | Emulsifier | Avg. Particle Size, A. | Percent Solids | Minutes at 350° F. | Dry, p.s.i. | Cyclic Boil, p.s.i. |
|---|---|---|---|---|---|---|---|
| The Invention: | | | | | | | |
| Composition 6 | 91% vinylidene chloride, 9% acrylonitrile. | 2-aminoethyl methacrylate hydrochloride. | 975 | 52.5 | 1½ | 238 | 109 |
| | | | | | 3 | 257 | 117 |
| Composition 7 | do | do | 1,370 | 52 | 1½ | 215 | 55 |
| | | | | | 3 | 254 | 57 |
| For Comparison: | | | | | | | |
| Composition 8 | 88% vinylidene chloride, 9% acrylonitrile, 3% ethylacrylate. | do | 995 | 49.3 | 1½ | 128 | (1) |
| | | | | | 3 | 271 | (1) |
| Composition 9 | 87% vinylidene chloride, 13% acrylonitrile. | do | 995 | 43 | 1½ | 165 | (1) |
| | | | | | 3 | 301 | (1) |
| Composition 10 | 85% vinylidene chloride, 9% acrylonitrile, 6% butylacrylate. | do | 975 | 49.8 | 1½ | 243 | (1) |
| | | | | | 3 | 303 | (1) |
| Composition 11 | 85% vinylidene chloride, 5% acrylonitrile, 10% butylacrylate. | Methacrylic acid ester of allyldimethyl-(2-hydroxy ethyl) ammonium chloride. | 1,630 | 45.7 | 1½ | 91 | (1) |
| | | | | | 3 | 282 | (1) |
| Composition 12 | Resorcinol-formaldehyde | | | | 1½ | (1) | (1) |
| | | | | | 3 | 288 | 204 |

[1] Delaminated.

EXAMPLE III

In each of a series of experiments (Compositions 13–17) several vinylidene chloride polymer latexes of varying polymeric composition, interpolymerized with about 2 weight percent of 2-aminoethylmethacrylate hydrochloride, based on the weight of interpolyer, were separately prepared utilizing the procedures essentially as described in Example I.

Three-ply yellow birch panels were prepared from 3/16 inch rotary cut veneer in a size of 8 inches by 12 inches. The formulations were brushed onto the core veneer and pressed for periods ranging from 1 to 4 minutes at 200 lbs./in.² using a platen temperature of 298° F. The panels were cut into standard plywood shear specimens and tested for "dry shear" and "cyclic boil" by the procedures as described in Example I. The results are recorded in Table III as follows.

TABLE III.—PLYWOOD STRENGTH DATA OBTAINED FROM PANELS MADE WITH VINYLIDENE CHLORIDE ACRYLONITRILE COPOLYMER LATEXES

| Test Sample Identification | Polymer Composition | Minutes at 298° F. | Dry, p.s.i. | Cyclic Boil, p.s.i. |
|---|---|---|---|---|
| The Invention: | | | | |
| 13 | 91% vinylidene chloride, 9% acrylonitrile | 1 | 580 | ........ |
| | | 2 | 656 | 329 |
| | | 4 | 576 | 311 |
| 14 | 92% vinylidene chloride, 8% acrylonitrile | 1 | 604 | 319 |
| | | 2 | 503 | 326 |
| | | 4 | 613 | 268 |
| 15 | 94% vinylidene chloride, 6% acrylonitrile | 1 | 479 | 215 |
| | | 2 | 458 | ........ |
| | | 4 | 512 | 256 |
| For Comparison: | | | | |
| 16 | 89% vinylidene chloride, 11% acrylonitrile | 1 | 542 | (1) |
| | | 2 | 607 | (1) |
| | | 4 | 551 | (1) |
| 17 | 95% vinylidene chloride, 5% acrylonitrile | 1 | 361 | (1) |
| | | 2 | 339 | (1) |
| | | 4 | 370 | 50 |

[1] Delaminated.

Similar good results, as illustrated in Examples 1-3 herein, are obtained utilizing an aqueous latex of an interpolymer of (a) from 90 to 94 weight percent vinylidene chloride and from 6 to 10 weight percent acrylonitrile, interpolymerized with (b) from about 1 to 4 weight percent, based on the weight of interpolymer, of at least one of the water-soluble salts of amino alcohol esters of unsaturated carboxylic acids, as hereinbefore defined.

What is claimed is:

1. In the process of laminating wood and wood products utilizing an adhesive composition based on an aqueous dispersion of a vinylidene chloride interpolymer, the improvement consisting of: utilizing as said adhesive composition (1) an aqueous latex of an interpolymer consisting essentially of (a) from about 90 to 94 weight percent vinylidene chloride and, from about 6 to 10 weight percent acrylonitrile interpolymerized with (b) from about 1 to 4 weight percent based on the weight of said interpolymer of at least one water-soluble salt of an amino alcohol ester of an unsaturated carboxylic acid of the formula:

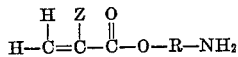

wherein "R" is an alkylene radical containing from 2 to 6 carbon atoms and "Z" is selected from the group consisting of hydrogen, halogen and an alkyl radical having from 1 to 4 carbon atoms, and (2) a finely divided water-dispersible filler in an amount of up to about 100 weight percent based on latex solids.

2. The process of claim 1 wherein said water-soluble salt of an amino alcohol ester of an unsaturated carboxylic acid is 2-aminoethyl methacrylate hydrochloride.

References Cited

UNITED STATES PATENTS

| | | | |
|---|---|---|---|
| 2,232,595 | 2/1941 | Dittmar et. al. | 260—8 |
| 3,058,939 | 10/1962 | Meier | 260—29.6 |
| 3,108,979 | 10/1963 | Le Fevre et al. | 260—29.6 |
| 3,239,408 | 3/1966 | Meyer et al. | 260—29.6 |
| 2,626,945 | 1/1953 | Carlin | 260—80.73 |
| 3,261,797 | 7/1966 | McDowell et al. | 260—29.6 |
| 3,188,234 | 6/1965 | Hahn et al. | 260—80.73 |

WILLIAM H. SHORT, *Primary Examiner.*

E. M. WOODBERRY, *Assistant Examiner.*

U.S. Cl. X.R.

260—8, 29.6, 80.73, 328